United States Patent [19]

Pike et al.

[11] 4,267,690

[45] May 19, 1981

[54] DISC REEL MOWER AND METHOD AND MEANS OF MANUFACTURING THE SAME

[76] Inventors: Carl A. Pike, 13600 S. Praire Ave., Hawthorne, Calif. 90250; J. Ellsworth Hixson, 1320 W. 16th St., Long Beach, Calif. 90813

[21] Appl. No.: 140,254

[22] Filed: Apr. 14, 1980

[51] Int. Cl.³ .......................................... A01D 55/20
[52] U.S. Cl. ...................................... 56/294; 56/249
[58] Field of Search ................ 56/289, 294, 295, 249, 56/250, 251, 252, 253, 254

[56] References Cited

U.S. PATENT DOCUMENTS

| | | | |
|---|---|---|---|
| 2,640,309 | 6/1953 | Benson | 56/294 |
| 2,772,533 | 12/1956 | Shibley | 56/289 |
| 2,790,293 | 4/1957 | Crotty | 56/294 |
| 3,054,247 | 9/1962 | Roesler | 56/294 |
| 3,514,934 | 6/1970 | Cassady | 56/294 |

FOREIGN PATENT DOCUMENTS 2264473 10/1975 France ................................. 56/294

Primary Examiner—Robert A. Hafer
Attorney, Agent, or Firm—Knobbe, Martens, Olson, Hubbard & Bear

[57] ABSTRACT

An improved mowing machine of the type which includes a bed knife, a cylindrical rotary knife which, in turn, comprises a plurality of generally elliptical discs mounted parallel to each other on a shaft, and means for rotating the cylindrical knife construction in peripheral contact with the bed knife, the improvement comprising ears formed on the discs extending oppositely outwardly from the plane of the discs at the respective ends of the major axes of the respective elliptical discs, the discs have formed therein a rectangular aperture which fits around a square shaft such that when the aperture rests against the shaft the discs are parallel to each other at an angle of 30 to 50 degrees, and further comprising supporting bars extending outwardly along the major axes of the discs and wherein the discs are specially constructed having a relatively unhardened center section and hardened surface sections on the respective planar surfaces of the discs such that the disc knives are self-sharpening is disclosed.

9 Claims, 11 Drawing Figures

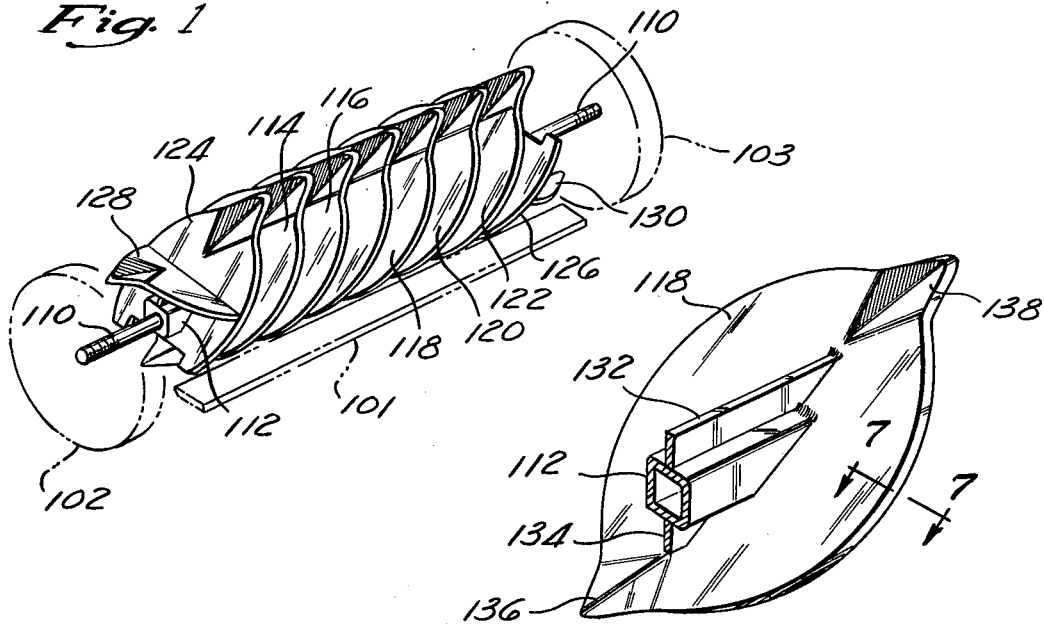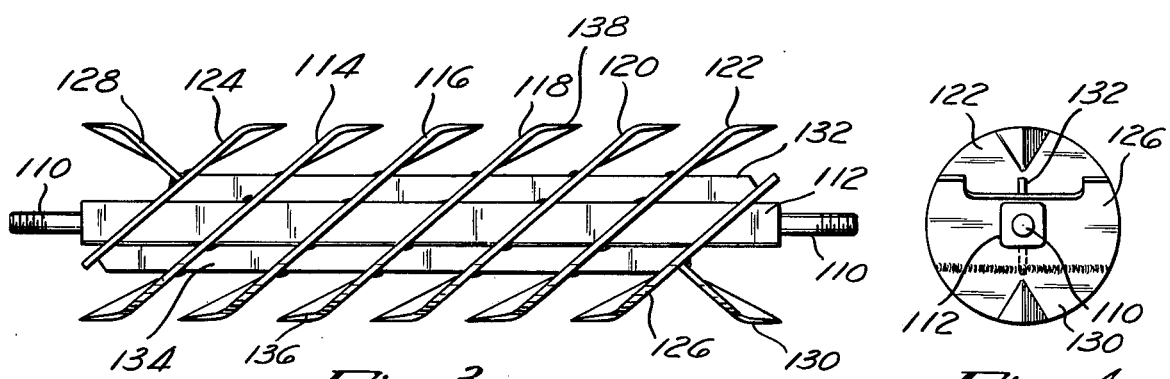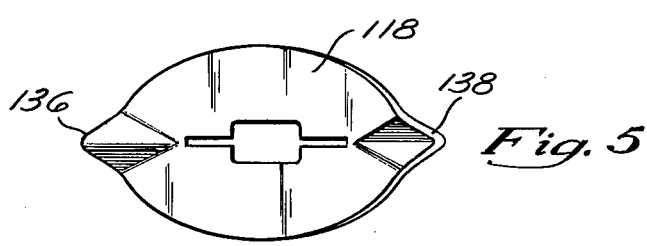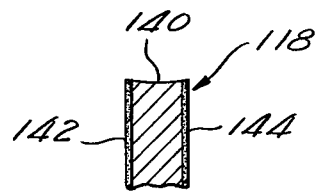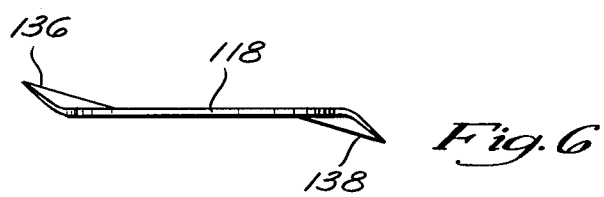

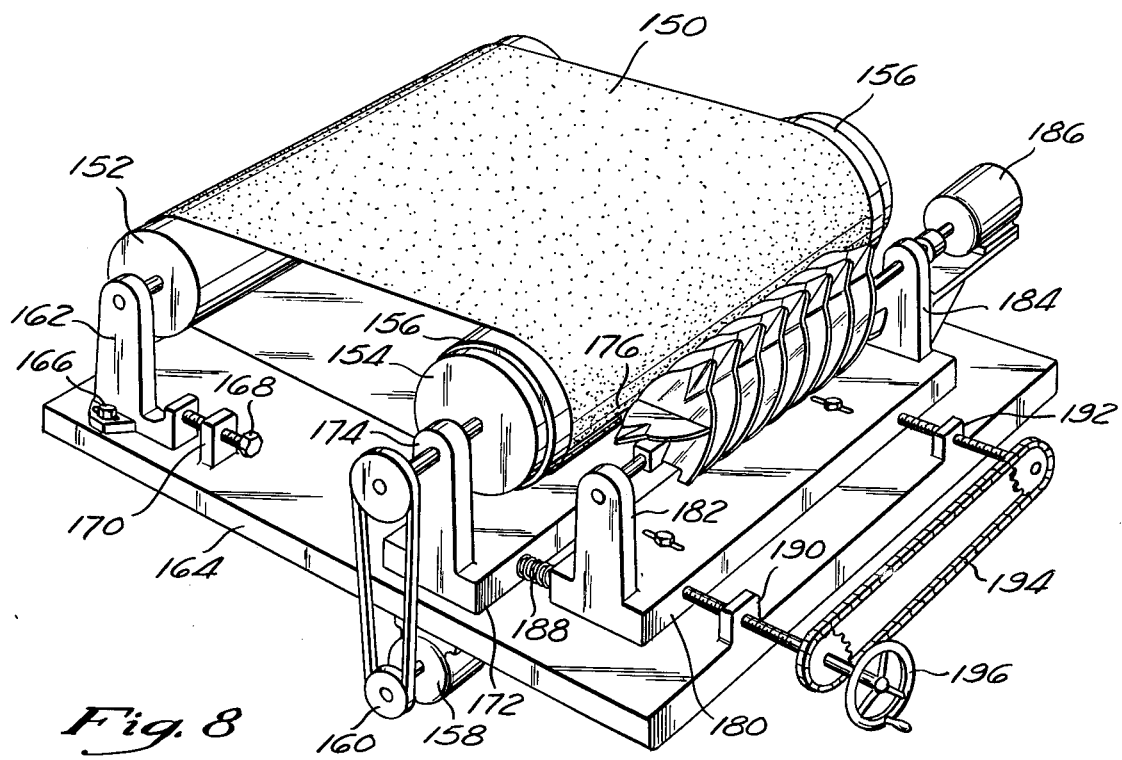
Fig. 8
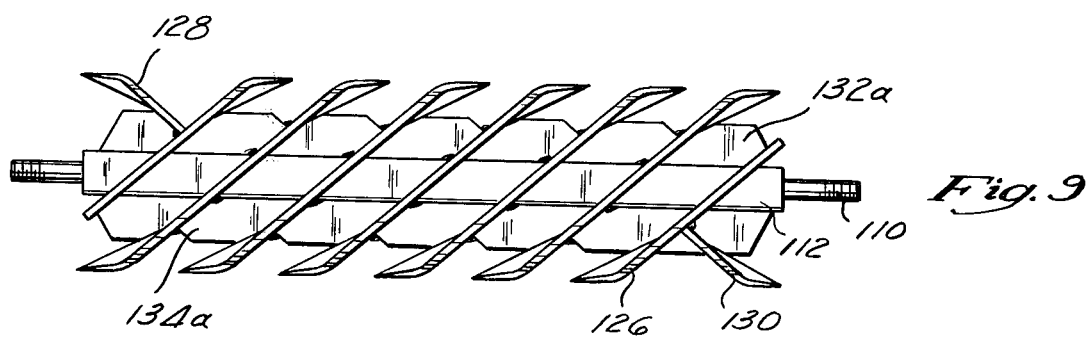
Fig. 9
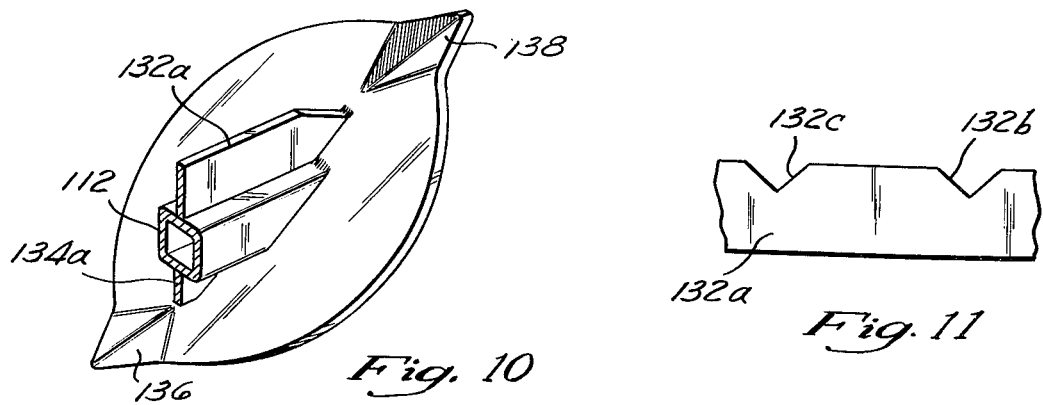
Fig. 10
Fig. 11

DISC REEL MOWER AND METHOD AND MEANS OF MANUFACTURING THE SAME

TECHNICAL FIELD

This invention relates to mowing machines, and in the most common usage, to lawn mowers and grass mowing machines generally.

In the conventional "reel" type of lawn mower, a bed knife, which is simply an elongate knife with a straight cutting edge, is traditionally provided. Sometimes the bed knife has notched edges or teeth formed on the edge. The reel is a cylindrical knife construction. Most reel mowers are made up of a plurality of serpentine-shaped elongate knives which, together, define a cylindrical surface. When the reel rotates, the cylindrical surface of the knife construction moves adjacent the bed knife and presents a cutting configuration to the grass, weeds, and the like as the mower moves across the lawn or the field.

Another form of reel mower which has been proposed, utilizes elliptical discs which lie generally parallel to each other but at an acute angle relative to the shaft of the reel and, of course, relative to the axis of the cylinder formed by the peripheral edges of the elliptical discs. As the reel is rotated, the peripheral edges of the elliptical discs are presented to the bed knife in a relative cutting relationship insofar as the grass is concerned. These reels have never gained acceptance. While there are some advantages which would appear to result from this type of reel construction, these advantages have not been realized because of difficulties and problems which heretofore have not been solved. It is recognized, for example, that there is somewhat less tendency of the elliptical-disc type reel mowers to throw rocks and debris great distances. Somewhat taller grass can be accommodated and there is some savings in power consumption.

A number of problems have for many years remain unresolved, however. One of the problems has been that it has been virtually impossible to manufacture and maintain the discs in relative parallel relationship. A closely related problem involves the difficulty in manufacturing the discs and fitting them around a single round shaft in such a way as to present the major axes of the ellipses of the discs in a straight line. An additional related difficulty has been that the discs tend to flex severely along the major axes thereof with the result that near the contact point between the major axis of a given disc and the bed knife, there becomes a wider gap which may simply widen as tough grass stems or other items come between the bed knife and the disc peripheral cutting edge. Disc failure, because of continuous flexing, has plagued these devices as well.

Another very serious drawback has been the tendency of these elliptical disc reel type mowers to give a "ripple" effect to the grass as it is mowed. As the major axes of the conventional, prior art, elliptical disc approaches the bed knife, there is a less and less acute cutting angle between the bed knife and the periphery of the disc at its major axis. Thus, the grass tends to be incompletely cut or cut somewhat longer than grass where the contact is at the minor axes of the elliptical discs. This leaves a rill of uncut or longer grass and gives a "ripple" effect to a lawn.

Another very serious problem which has affected the prior art relative to elliptical disc type reel mowers is the failure of the mower reel to "fan" and lift and throw the grass, either into a grass catcher or to lift it and throw it so it rests lightly on the top of the newly cut grass.

The present inventors have experimented with other disc configurations and have made some limited development of elliptical disc reel type mowers in which an ear is formed on the disc. Early usages of this configuration indicated that the concept of ear formation was sound, but many problems were introduced and many of the problems of the prior art remained unsolved. Among the problems which remained unsolved were the problems that the grass was not lifted or fanned, blade failure was common, because to continuous flexing, there still tended to be some ripple effect because along the major axis of the disc there was residual flexing which did not provide a good cut, especially in the heavy, thick or wet grass.

The present invention is designed to solve these problems and has overcome the extremely serious problems of the prior art.

DISCLOSURE OF THE INVENTION

The present invention is an improvement, rather a collection of synergistically-coacting improvements, in mowing machines of the general construction which include an elongate bed knife, a generally cylindrical rotary knife construction which, in turn, comprises a plurality of generally elliptical discs mounted on a shaft lying generally in parallel planes to each other but at an acute angle to the shaft axis and means for rotating the knife construction such that the periphery of the discs move in close proximity with the elongate bed knife, thereby presenting a cutting combination to grass and the like between the elongate knife and the respective discs. The improvement comprises discs which have ears extending outwardly in opposite directions from the plane of the discs, the ears being formed at the respective ends of the major axes of the respective discs, the discs also having generally rectangular apertures therethrough with slots extending outwardly along the major axes of the discs from the ends of these rectangular apertures toward the ears on the discs. These rectangular apertures fit over a generally square shaft, the diameter of the shaft and the length of the rectangular portion of the aperture being such that the discs rest with the ends of the rectangular apertures against the sides of the square shaft such that the planes of the discs are at an angle of about 40 degrees, preferably, and generally at an angle of about 30 to 50 degress relative to the axis of the shaft. A pair of elongate flat supporting bars extend through the slots in the discs outwardly from the shaft to physically support the discs along the major axes thereof and to fan the grass or the like by the rotation of the knife construction during mowing. In the preferred embodiment, the width of the supporting bars is greater than the length of the slots in the discs and the supporting bars have formed therein a plurality of notches which are so formed and configured that one of the notch edges lies against the surface of each of the discs, proximate the shaft, thereby defining the angle of the discs relative to the shaft and to each other and to support the major axis of the discs beyond the ends of the notches therein. Another important facet of the invention is the self-sharpening construction of the discs in which the planar surfaces of the discs are case hardened, or otherwise hardened such that the surfaces for a short depth, typically from about 0.005 to about 0.0025 inch, is harder than the relatively softer central core section of the disc, looking perpendicular to the plane of the disc. The central core section comprises at least about two-third of the thickness of the disc and may comprise as much as nine-tenths or more of the disc thickness. Since the center of the disc is softer than the surfaces, the center tends to wear more rapidly than the surfaces leaving the hardened surfaces, which are the cutting edges, extending outwardly. Thus, the disc reel cutting edges are self-sharpening.

BRIEF DESCRIPTION OF THE DRAWINGS

FIG. 1 is a perspective view of the elliptical disc type mower improvement of this invention, showing in phantom lines the driving wheels at the ends of the shaft of the knife construction which comprises this invention. Conventional driving means are used throughout the present invention simply comprising the improvement in the manufacture of the reel of the mower.

FIG. 2 is a perspective view of a single elliptical disc mounted on the shaft with the fanned support elements in place.

FIG. 3 is a side view of a reel of this invention.

FIG. 4 is an end view of the reel of this invention.

FIG. 5 is a plane view of a disc used in the manufacture of this invention.

FIG. 6 is a side view of a disc used in the manufacture of this invention.

FIG. 7 is a cross-sectional view of a disc utilized in this invention taken along the lines 7—7 in the direction of the arrows as shown in FIG. 2, showing the hardened surfaces of the disc.

FIG. 8 is a perspective view of the machine for sharpening and manufacturing the reels of this invention.

FIG. 9 is a side view of an improved and preferred embodiment of the reel of this invention, in which a wider fan and supporting element is used to support and back up the discs along the major axes thereof.

FIG. 10 is a perspective view of the configuration of the reel shown in FIG. 9.

FIG. 11 is a side view of a portion of one of the support fanning elements of the invention.

BEST MODE FOR CARRYING OUT THE INVENTION

The invention comprises improvement in reel type lawn grass and field mowing machines of the type which generally comprise an elongate bed knife shown in FIG. 1 in phantom lines at 101 and one or more driving wheels 102 and 103 also shown in FIG. 1 in phantom. The driving wheels may be the support wheels for the mower or may be driven by some power or other means. Conventional mower constructions are contemplated within this invention throughout, the only difference being the improved reel of the mowing machine.

As shown in FIGS. 1 and 3, the reel comprises a shaft indicated generally at 110 which comprises a square portion 112, the general configuration of which is best shown in FIG. 4. The round portion 110 is used in the conventional way as a journal support and for attachment to whatever driving means is utilized. The significance of the square shaft is discussed hereinafter. The reel also comprises a plurality of generally elliptical discs indicated at 114 through 122. The reel typically, but not necessarily, also includes some partial ellipses, i.e., discs which are only partially in the form of an ellipse, being cutting off so as to form the end of the reels. Two ends pieces 124 and 126 lie generally parallel to the other elliptical discs 114 through 122 while, the preferred embodiment, two short partial elliptical sections 128 and 130 are formed simply to square off the end of the cylinder formed by the discs. These latter disc segments extend generally perpendicularly to the plane of the disc elements or disc segments, but otherwise work in the same manner. Insofar as the description and discussion of this invention is concerned, all of these elliptical discs and disc sections will be considered elliptical discs, recognizing, of course, that incomplete elliptical discs are not full ellipses. It should also be recognized that the terms "ellipses" and "elliptical" are used only generally and not in a precise mathematical sense. The discs of this invention will generally approximate mathematical ellipses; however, no mathematical precision is to be inferred from the use of this term which describes, rather, the overall general shape and not necessarily the mathematical dimensions of the discs.

The reel also comprises a pair of support and fanning rods 132 and 134 which extend from proximate the shaft outwardly along the major axis of each of the respective elliptical discs. The terms major axis and the minor axis are used only generally in the mathematical sense, but the elliptical discs of this invention will inherently include, of course, a major axis and a minor axis.

FIG. 2 depicts a single elliptical disc mounted on the shaft with the support fanned element. Disc 118 out of the plurality of discs on the shaft is selected as exemplary to be depicted in FIG. 2, and in FIGS. 5 and 6. In FIG. 2 it will be seen that the rectangular aperture which is in the center of the disc 118, the major diameter of the rectangle corresponding to the major axis of the disc, is fitted over the square shaft 112. When so fitted, and allowed to rest at an angle, the plane of the disc resides at an acute angle relative to the axis of the shaft. That acute angle is, in the preferred embodiment, about 40 degrees, but considerable variation is permitted and any angle between about 30 degrees and between about 50 degrees can be used. 40 degrees appears to be about optimum, however. The use of the square shaft has aided greatly in defining the relative angles of the discs to each other and to the shaft and provided greater strength and stability and tended to overcome the prior art problems in large measure.

Another feature of the invention which is extremely valuable but did not, alone, solve the prior art problems, is the formation of ears extending, as best shown in FIG. 6, in opposite directions relative to the plane of the disc, and, as best shown in FIG. 5, at the respective ends of the major axis of the disc. In disc 118, these ears are identified as ears 136 and 138. These ears formed at the periphery of the disc at the end of the major axis of the elliptical disc provide an acute angle and rapid relative movement between the disc periphery and the bed knife as the disc rotates such that the major axis approaches the bed knife. In the prior art, there was very little relative lateral movement as between the periphery of the disc and the bed knife in this region. This, and other problems, resulted in "rills" and a wavey cut pattern which was undesirable from both the visual and the lawn management point of view. The inclusion of these ears tended to solve the problems with the prior art but alone was unsatisfactory because there was still considerable flexing of the blade along the major axis which permitted some reel deformation notwithstanding the presence of the ears.

The combination of the square shaft to very accurately position the major axes of the discs in line with each other, the provision of the ears to provide rapid relative movement between the disc periphery at the major axis of the disc and the bed knife, and the provision of the support and fan elements 132 and 134, together have solved problems and resulted in advantages which far exceed the individual contributions of these respective elements. There is a synergistic coaction between the effects of these elements which rises far beyond the mere addition of various effects.

Another extremely significant development is depicted in FIG. 7 in which the disc 118 is shown in partial cross-section. The disc 118 has a relatively soft center core section 140 with hardened surfaces 142 and 144. The discs themselves may be formed of relatively soft steel, although somewhat hardened steel is generally preferred. It is extremely important, however, for maximum efficiency and minimum energy usage plus the savings of cost to resharpening, that the surfaces of the discs, 142 and 144, be case hardened, otherwise surface hardened, relative to the central portion 140 of the disc.

In the prior art knives, the periphery of the discs tended to wear round, i.e, the edges of the discs on the surface portions wear before the center. This resulted in a round knife edge interacting with the bed knife and often either did not cut or simply crushed the grass or other vegetation between the bed knife and the disc. This resulted in a poor quality cut and sometimes damaged the overall appearance of the lawn because of the brown resulting from crushed ends of the grass.

These problems have been overcome by providing a self-sharpening disc. It will be understood, looking at the present disclosure, that as the disc periphery rotates adjacent the blade, the center portion of the disc will wear more rapidly than the surface portions, by reason of the dirt or other abrasive material which contacts the periphery of the discs. This will leave hardened edge portions which cut cleanly and provide a self-sharpening effect.

The device of FIG. 8 comprises a continuous elongate abrading belt 150 and means, such as the drums 152 and 154 for carrying or revolving the continuous belt in a revolutionary path and presenting one portion of the lateral surface of the continuous abrading belt in a straight line on the drum 154. A resilient surface 156, which may be a thin layer of rubber or other resilient material, is included on the drum 154. The thickness of this layer will be from about one-sixteenth inch to about one-half inch, generally. Any kind of desired drive means such as the motor 158 and the pulley and belt combination indicated generally at 160 may be used to drive the rollers and cause the abrading belt to revolve in a continuous path presenting a straight line backed by a resilient flat configuration. The drum 152 may be supported in any desired manner. It is desirable to provide some kind of support means such as the journaled bracket 162 which is movably mounted on the base 164 by bolts 166 which may be loosened or tightened. The bracket 162 may be moved forwardly and backwardly by means of an adjusting bolt 168 which is threadedly received through a threaded aperture in bracket 170. This combination provides means for adjusting the relative tension of the sides of the continuous belt to assure that the belt travels in a continuous path and does not ride from side-to-side in its revolution.

Likewise, any convenient means may be provided for rotationally mounting the drum 154. In the preferred embodiment, a combination bracket and platform 172 which has a journaled upward bracket portion 174 on one end and a comparable structure on the other end for receiving the shaft portions of the drum 154 is provided. This bracket arrangement fixes the position of drum 154 and defines a straight line configuration for the belt with a resilient backing means, the straight line area being indicated generally at 176. A movable mount for supporting the reel is also provided. In a simplified form, FIG. 8 depicts such a bracket as comprising a base 180 with upstanding journal bracket elements 182 and 184 and a drive means 186 for rotatably driving the blade construction once it is mounted on the brackets. The brackets provide journals or other devices for connecting the blade for rotation. Rotation is provided by the motor 186. Springs, one of which is shown at 188, or other devices for permitting the controlled adjustment of the bracket 180 forwardly and backwardly, relative to the flat surface presented by the abrading belt, are provided along with means for moving the bracket back and forth. The means for moving comprises a pair of screws threadedly received in apertures in brackets 190 and 192 which are, in simplified form, shown on the plate 164. A wheel, or other device for turning these screws, which may be interconnected in any manner, a chain and sprocket being generally indicated at 194, is provided. By turning the wheel 196, in this simplified depiction, the bracket 180 is adjustably moved toward and away from the straight line surface provided by the belt with the resilient backing.

In carrying out the manufacturing and sharpening process, the belt is caused to revolve in a continuous path to present a rearwardly resiliently cushioned straight line surface, the periphery of the elliptical discs, which are in a cylindrical configuration overall, are presented against this straight line, resiliently backed surface and, preferably, the blade is rotated, generally in a direction such that the relative peripheral movement of the discs and the surface of the abrading belt are maximized. This rotational relationship between the cylindrical surface of the cutting knife and the straight line presented by the abrading belt sharpens, with great precision and accuracy, the discs which form the cylindrical cutting blade.

A modified and, in some embodiments, preferred form of the invention is depicted in FIG. 9, with individual elements being shown in FIGS. 10 and 11.

The embodiment of FIG. 9 is identical in all respects to the embodiment of FIG. 3, with the exception that the support and fanning elements 132a and 134a are wider, relative to the length of the slot in the disc 118, and extend beyond the end of the slot. The element, one of which is shown in FIG. 11, as part of element 132a includes a plurality of notches one of which is shown at 132b. Each of these notches has one surface indicated at 132c in FIG. 11, against which the back or acute angle surface of the elliptical disc rests beyond the ends of the slots. This provides additional fanning action and a surprisingly greater strength to the overall structure and a longer life and better cutting as well. This result was quite surprising and it took many efforts to determine that there was such an enormous advantage from a relatively uncomplicated modification.

It will be apparent from the foregoing discussion that the present invention comprises the synergistic result of a number of variations and improvements, the sum total of which far exceeds the individual contributions of the various improvements and elements.

It will also be realized that variations, within the scope and spirit of the present teachings, may be made without departing from the invention.

What is claimed is:

1. In a mowing machine of the construction which includes a bed knife and a generally cylindrical knife construction made up of a plurality of generally elliptical discs lying generally parallel to each other at an acute angle to the cylindrical axis and means for rotating the cylindrical knife construction such that the periphery of the discs form cutting edges coacting with the bed knife, the improvement:

wherein the discs which have major and minor axis include adjacent the peripheral end of the major axis thereof an ear extending away from the plane of the disc respectively in opposite directions from said plane, the ears being so constructed and configured as to present a cutting edge at an acute angle at the bed knife as the disc is rotated, as part of the cylindrical knife construction, adjacent the bed knife; and comprising supporting fan structures extending outwardly generally along the major axes of the discs from proximate the axis of the cylindircal knife construction, said supporting fan structures being so constructed and configured as to support the discs against excessive flexing along the major axis thereof and lift and blow during the use of the machine for mowing, the discs comprising:

a central core section of unhardened metal, said central core section comprising at least two-thirds the thickness of the disc; and hardened surfaces on each side of the central core section.

2. In a mowing machine of the construction which includes a bed knife and a generally cylindrical knife construction made up of a plurality of generally elliptical discs lying generally parallel to each other at an acute angle to the cylindrical axis and means for rotating the cylindrical knife construction such that the periphery of the discs form cutting edges coacting with the bed knife, the improvement wherein:

the discs which have major and minor axis include adjacent the peripheral end of the major axis thereof an ear extending away from the plane of the disc respectively in opposite directions from said plane, the ears being so constructed and configured as to present a cutting edge at an acute angle at the bed knife as the disc is rotated, as part of the cylindrical knife construction, adjacent the bed knife; and comprising supporting fan structures extending outwardly generally along the major axes of the discs from proximate the axis of the cylindrical knife construction, said supporting fan structures comprising elongate generally flat elements multiply notched to receive the discs in resting position against one portion of each notch and being so constructed and configured as to support the discs against excessive flexing along the major axis thereof and lift and blow during the use of the machine for mowing.

3. The mowing machine of claim 2 wherein the discs comprise:

a central core section of unhardened metal, said central core section comprising at least two-thirds the thickness of the disc; and hardened surfaces on each side of the central core section.

4. The mowing machine of claim 3 wherein the thickness of the hardened surfaces is between 0.005 and 0.025 inch.

5. The mowing machine of claim 1 wherein the thickness of the hardened surfaces is between 0.005 and 0.025 inch.

6. In a mowing machine of the construction which includes:

an elongate bed knife;

a generally cylindrical rotary knife construction which comprises, in turn, a plurality of generally elliptical discs mounted on a shaft lying in generally parallel planes to each other at an acute angle to the shaft axis; and means for rotating the knife construction such that the periphery of the discs thereof move in close proximity with the elongate bed knife presenting a cutting combination to grass and the like between the elongate knife and the discs, the improvement:

wherein the discs have ears extending outwardly in opposite directions from the plane of the discs at the respective ends of the major axes of the respective discs;

wherein the discs have formed in the center thereof generally rectangular apertures therethrough and slots extending outwardly along the major axes of the discs from the end of the rectangular aperture toward the ears of the discs;

wherein the shaft is a generally square shaft, the diameter of the shaft and the length of the rectangular aperture through the discs being so dimensioned and configured that the discs rest with the ends of the rectangular apertures against the sides of the shaft such that planes of the discs are at an angle of from about 30 to about 50 degrees relative to the axis of the shaft; and further comprising a pair of elongate flat supporting bars extending through the slots in the discs outwardly from the shaft toward the ears to physically support the discs along the major axes thereof and to fan the grass or the like by the rotation of the knife construction during mowing.

7. The mowing machine of claim 6 wherein:

the width of the supporting bars is greater than the length of the slots in the discs and the supporting bars have formed therein a plurality of notches so formed and configured that one of the notch edges lies against the surface of the discs proximate the shaft for defining the angle of the discs to the shaft and to each other and to support the major axis of the discs beyond the ends of the notches therein.

8. The mowing machine of claim 7 wherein the discs comprise:

a central core section of unhardened metal, said central core section comprising at least two-thirds the thickness of the disc; and hardened surfaces on each side of the central core section.

9. The mowing machine of claim 8 wherein the thickness of the hardened surfaces is between 0.005 and 0.025 inch.

* * * * *